No. 865,352. PATENTED SEPT. 10, 1907.
F. W. BLOXHAM.
CHAIN TIGHTENER.
APPLICATION FILED SEPT. 13, 1906.

Witnesses
W. S. Rockwell
Marguerite T. Waters.

Inventor
Fred W. Bloxham
By
Attorneys

THE NORRIS PETERS CO., WASHINGTON, D. C.

UNITED STATES PATENT OFFICE.

FREDERIC W. BLOXHAM, OF GRUNDY CENTER, IOWA.

CHAIN-TIGHTENER.

No. 865,352.　　　　Specification of Letters Patent.　　　　Patented Sept. 10, 1907.

Application filed September 13, 1906. Serial No. 334,506.

*To all whom it may concern:*

Be it known that I, FREDERIC W. BLOXHAM, a citizen of the United States, residing at Grundy Center, in the county of Grundy, State of Iowa, have invented certain new and useful Improvements in Chain-Tighteners; and I do hereby declare the following to be a full, clear, and exact description of the invention, such as will enable others skilled in the art to which it appertains to make and use the same.
This invention has relation to chain-tightening means for use on agricultural implements and on or in any class or kind of machines where a chain for transmitting motion; as a sprocket-chain or other similar contrivance is liable to be thrown off its wheels, if not kept taut, by various causes or happenings.

The nature of the invention is clearly shown as embodied in the device illustrated in the annexed drawings forming a part of this specification, in view of which it will first be described with respect to its construction and mode of operation, and then be pointed out in the subjoined claims.

Figure 1:
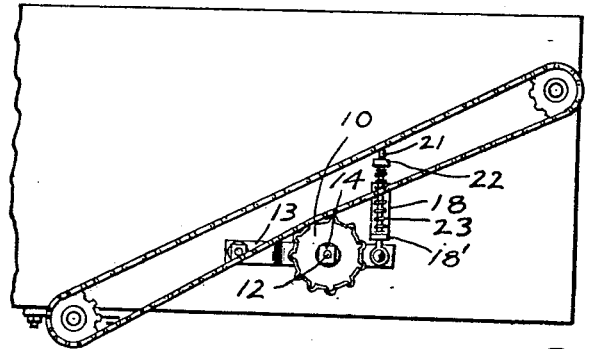
Figure 3:
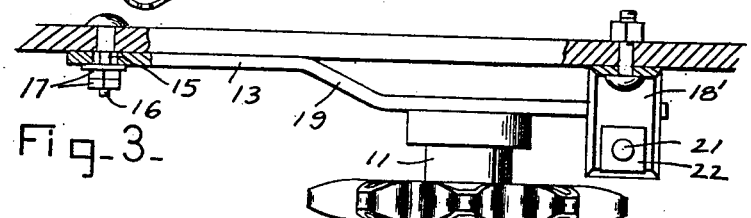
Figure 2:
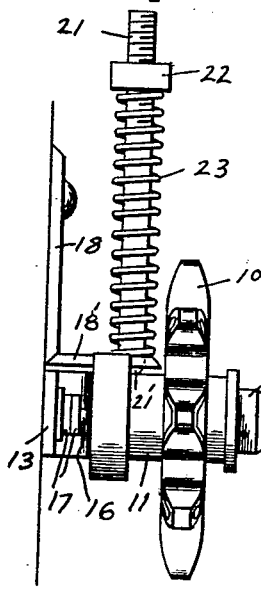
Figure 5:
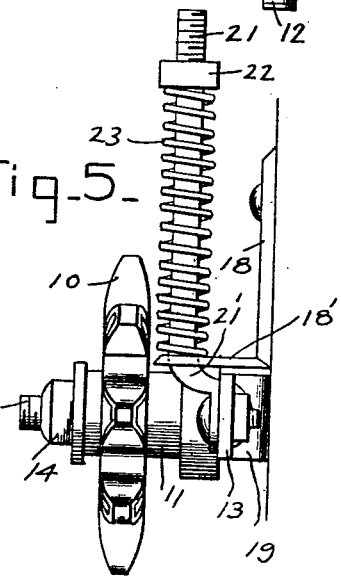
Figure 4:
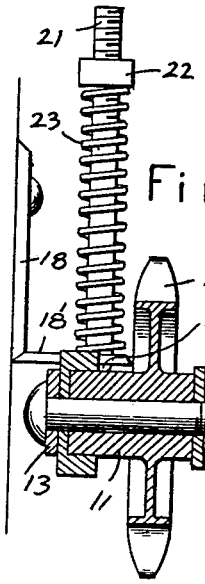

Of the drawings:—Figure 1 is a side view, showing the device as operating under side of a chain-belt to tighten the same. Fig. 2 is a forward view. Fig. 3 is a top view. Fig. 4 is a vertical sectional view through the sprocket wheel and its immediately associated parts. Fig. 5 is an end view opposite to that shown in Fig. 2.

Similar numerals of reference designate similar parts or features, as they case may be, wherever they occur.
In the drawings 10 designates a sprocket-wheel which may be of any size and form suited to the circumstances of the case, the hub 11, of which wheel extends beyond the faces on both sides, and is arranged, to turn on a bolt 12 extended through a strap 13 or other supporting means. A washer is arranged on the bolt 12 at the forward end of the hub, and a nut 14, is turned on the screw-threaded end of the bolt to keep the wheel 10 in place.

The outer end of the strap 13 is provided with a bolt hole 15 and the rounded part of the shank of a bolt, 16, smaller in diameter than the diameter of the bolt-hole is extended therethrough, and has nuts 17 turned on its outer end, one operating to lock the other. The part of the bolt shank adjacent to the head is square and passes through the material which may be supposed to be the side of a wagon box, to which the wheel-supporting strap 13 is attached. The said strap is pivoted; as it were, on the round part of the bolt 16. The strap is bent at or near its center 19 so as to offset the sprocket wheel from the means to which the strap is connected.

18 designates a vertically arranged strap bolted at its upper end to the same means as that to which the strap 13 is connected, the said bolted connection of the vertical strap being such as to allow the strap to turn if need be on the bolt as a pivot. The lower end of the vertical strap is turned out at a right angle to the body part as at 18′ and a hole is formed through the said angular portion 18′ through which the offset end 21′ of the bolt 21, is extended said offset end being pivoted to the free end of the pivoted strap 13. The lower end of the bolt 21 has a nut 22 turned on its screw-threaded end, and between the said nut and the lower face of the angular portion 19 of the vertical strap, and coiled around the bolt 21 to a tension spring, 23, the stress of which is regulated by the nut 22.

It will now be seen that with the parts secured in place as described so that the wheel 10 may bear upward on a drive-chain, said wheel will act as a yielding tightener to the chain belt.

Of course the straps and other connections may be varied in form to suit varying conditions, the illustration herein given being merely an instance to show how one use may be made of the invention.

The chain-tightener, it may be explained is intended for use on a wagon-bed to operate in connection with a manure spreader, but this suggested use is not intended to limit the invention, but merely to assist in an understanding of its mode of operation.

What is claimed is:

A chain-belt tightener for a wagon-box, comprising the combination, with a longitudinal strap adapted to be pivoted at one end to the box the said strap being centrally offset, and a sprocket wheel rotatably supported on the offset portion of said strap, of a vertical strap connected with the supporting means for the first-mentioned strap and having an apertured offset lower end, 18′, a threaded bolt extended through the aperture of said offset and itself offset at its lower end and pivotally connected with the free end of the first-mentioned strap, a nut turned on the upper end of said bolt, and a spring interposed between the nut and said offset end of the vertical strap to hold the said sprocket-wheel in connection with a chain-belt, the said nut and spring being employed to cause the sprocket-wheel to bear with greater or less energy on the chain to tighten the same.

In testimony whereof, I affix my signature, in presence of two witnesses.

FRED. W. BLOXHAM.

Witnesses:
J. W. PEPPERMAN,
GEO. EGGABROAD.